United States Patent [19]
Pyle et al.

[11] Patent Number: 6,092,554
[45] Date of Patent: Jul. 25, 2000

[54] TECHNIQUE FOR MANUFACTURING HOSE

[75] Inventors: Kevin James Pyle, Uniontown; Mark Samuel Sinsky, Akron; Paul Harry Sandstrom, Tallmadge, all of Ohio

[73] Assignee: The Goodyear Tire & Rubber Company, Akron, Ohio

[21] Appl. No.: 09/004,237

[22] Filed: Jan. 9, 1998

Related U.S. Application Data

[62] Division of application No. 08/767,555, Dec. 16, 1996, Pat. No. 5,762,850.

[51] Int. Cl.$^7$ ...................................................... F16L 11/04
[52] U.S. Cl. .............................................................. 138/118
[58] Field of Search ................................... 138/118, 118.1, 138/129; 264/150, 209.6, 236, 328.2, 331.13, 347; 525/178, 179, 184

[56] References Cited

U.S. PATENT DOCUMENTS

| | | | |
|---|---|---|---|
| 4,005,054 | 1/1977 | Bonnefon et al. | 264/331.13 |
| 4,088,714 | 5/1978 | Huff | 525/193 |
| 4,489,034 | 12/1984 | Davidson | 264/331.15 |
| 5,268,134 | 12/1993 | Burlett et al. | 264/209.6 |

*Primary Examiner*—Jan H. Silbaugh
*Assistant Examiner*—Kenneth M. Jones
*Attorney, Agent, or Firm*—Alvin T Rockhill

[57] ABSTRACT

Hoses are often reinforced with fabric to improve their performance characteristics, such as burst strength. For instance, radiator hose used in automotive applications is generally reinforced with continuous yarn. However, it is a labor-intensive process to manufacture such hoses which include fiber reinforcements. A substantial amount of material waste also generally occurs in the manufacture of such fiber-reinforced hose. By utilizing the technique of this invention, hose which has a high level of burst strength can be manufactured without including continuous yarn reinforcement. This invention specifically reveals a process for manufacturing a hose which comprises (1) extruding a rubber composition into the form of a tube, wherein the rubber composition is comprised of (a) a polypropylene/polyethylene alloy comprised of (i) a low melt index polyethylene and (ii) polypropylene, wherein the polypropylene is homogeneously dispersed throughout the polyethylene in the polypropylene/polyethylene alloy, (b) an EPDM rubber, (c) carbon black, (d) at least one curative, (e) zinc oxide, (f) a processing oil and (g) stearic acid; (2) shaping the tube into the geometric form desired for the hose; and (3) curing the rubber composition at a temperature within the range of 130° C. to 210° C. to produce the hose.

18 Claims, No Drawings

TECHNIQUE FOR MANUFACTURING HOSE

This application is a divisional application of application Ser. No. 08/767,555, filed Dec. 16, 1996, now U.S. Pat. No. 5,762,850.

BACKGROUND OF THE INVENTION

Hoses are often reinforced with continuous yarn to improve physical performance characteristics, such as burst strength. For example, radiator hoses for automobiles and trucks are generally reinforced with continuous yarn reinforcing elements. Continuous yarn reinforcements are typically used to improve the burst strength of such hoses. Even though building such fiber-reinforced hoses is a labor-intensive operation which results in a substantial amount of material waste, such techniques have been required to meet the demands of the automotive industry.

Building fiber reinforcements into hoses is a labor-intensive operation. After such hoses are built, they are typically trimmed to the exact size required. The fiber reinforcement containing material trimmed from such hoses generally has to be scrapped since it is not typically possible to recycle such fabric containing material.

Hoses have been made by extruding rubber compositions into the form of a tube which is subsequently shaped into the desired form and cured. Such techniques are advantageous in that they reduce labor costs, in-process inventory and waste. However, hoses made utilizing such extrusion techniques have typically not had the physical strength demanded by the automotive industry for radiator hose. More specifically, such hoses have had low burst strength.

By utilizing the technique disclosed in U.S. Pat. No. 5,268,134, hose which exhibits a burst strength of about 115 pounds per square inch can be made without utilizing fabric reinforcements. This process specifically comprises (1) extruding a rubber composition into the form of a tube, wherein the rubber composition is comprised of (a) an EPDM alloy comprised of (i) functionalized EPDM rubber, (ii) an EPDM rubber having thermoplastic side chains grafted thereto and (iii) dispersed thermoplastic wherein the thermoplastic is selected from the group consisting of nylons, polyesters and polyphenylene oxides, (b) an EPDM rubber, (c) carbon black, (d) at least one curative, (e) zinc oxide, (f) a processing oil and (g) stearic acid; (2) shaping the tube into the geometric form desired for the hose; and (3) curing the rubber composition at a temperature within the range of 130° C. to 210° C. to produce the hose.

U.S. Pat. No. 5,268,134 also discloses a process for manufacturing hose which comprises injection molding a rubber composition into the desired geometric form for the hose at a temperature which is within the range of 130° C. to 210° C., wherein the rubber composition is comprised of (a) an EPDM alloy comprised of (i) functionalized EPDM rubber, (ii) an EPDM rubber having thermoplastic side chains grafted thereto, and (iii) dispersed thermoplastic wherein the thermoplastic is selected from the group consisting of nylons, polyesters, and polyphenylene oxides, (b) an EPDM rubber, (c) carbon black, (d) at least one curative, (e) zinc oxide, (f) a processing oil, and (g) stearic acid; (2) shaping the tube into the geometric form desired for the hose; and (3) curing the rubber composition at a temperature within the range of 130° C. to 210° C. to produce the hose.

SUMMARY OF THE INVENTION

By utilizing the technique of this invention, hose which exhibits a burst strength of at least 140 pounds per square inch and preferably at least 150 pounds per square inch can be manufactured without the need for fabric reinforcement. Such hoses also exhibit an acceptable level of hardness for utilization in automotive applications. For example, it is important for hoses used in automotive applications to have a Shore A hardness of about 88 or less and preferably 85 or less.

This technique of this invention results in reduced labor cost, in-process inventory and waste. Its use also reduces the number of manufacturing steps required and the need for certain machinery. Hoses having adequate burst strength can be made utilizing this technique at a much lower cost than equivalent hoses made with fabric reinforcements.

This invention specifically relates to a process for manufacturing a hose which comprises (1) extruding a rubber composition into the form of a tube, wherein the rubber composition is comprised of (a) a polyethylene/polypropylene alloy comprised of (i) low melt index polyethylene and (ii) polypropylene, wherein the polypropylene is homogeneously dispersed throughout the polyethylene in the polypropylene/polyethylene alloy, (b) an EPDM rubber, (c) carbon black, (d) at least one curative, (e) zinc oxide, (f) a processing oil and (g) stearic acid; (2) shaping the tube into the geometric form desired for the hose; and (3) curing the rubber composition at a temperature within the range of 130° C. to 210° C. to produce the hose.

The subject invention also discloses a process for manufacturing a hose which comprises injection molding a rubber composition into the desired geometric form for the hose at a temperature which is within the range of 130° C. to 210° C., wherein the rubber composition is comprised of (a) a polypropylene/polyethylene alloy comprised of (i) a low melt index polyethylene and (ii) polypropylene, wherein the polypropylene is homogeneously dispersed throughout the polyethylene in the polypropylene/polyethylene alloy, (b) an EPDM rubber, (c) carbon black, (d) at least one curative, (e) zinc oxide, (f) a processing oil and (g) stearic acid; (2) shaping the tube into the geometric form desired for the hose; and (3) curing the rubber composition at a temperature within the range of 130° C. to 210° C. to produce the hose.

By utilizing the techniques of this invention reinforcing polypropylene can be dispersed into rubber compounds at relatively low temperatures. This allows for the preparation of polypropylene containing rubber compounds at temperatures which are not detrimental to the elastomer base or other additives. For instance, such polypropylene containing rubber compounds can be mixed at temperatures as low as about 95° C. which is commonly used in making productive rubber compounds. These rubber compounds are useful in the manufacture of tires, hoses, belts, and other engineered products. This technique is applicable to other high melting polyolefins which can be blended with lower melting polyolefins to give alloys which can be dispersed into rubber compounds at temperatures above the softening point or the melting point of the lower melting polyolefin.

The present invention more specifically discloses a process for dispersing polypropylene into a rubber compound at a temperature below the melting point of the polypropylene which comprises: (1) preparing a polyethylene/polypropylene alloy which is comprised of (i) a low melt index polyethylene and (ii) polypropylene; and (2) mixing the polyethylene/polypropylene alloy into the rubber compound at a temperature which is below the melting point of the polypropylene and above the melting point of the polyethylene. The mixing of step (2) will typically be carried out at a temperature which is within the range of 95° C. to 120° C.

DETAILED DESCRIPTION OF THE INVENTION

The first step in the process of this invention involves extruding a special rubber composition into the form of a tube. This can be done continuously by extruding the rubber composition through an annular die. Generally, an annular flow channel is formed by the outer body of the die and a die mandrel. A wide variety of annular die designs can be utilized. For instance, the mandrel can be supported mechanically onto the outer die body by "spider legs." The disadvantage of utilizing such die designs which include spider legs is that they produce "weld lines" and streaks which are caused by the presence of the spider legs which split the flow of polymer. The weld lines caused by die designs including spider legs are undesirable because they represent points of mechanical weakness in the hose.

It is preferred to use dies wherein the mandrel is mechanically attached to the die body in such a way that obstacles are not presented to the flow of the annular region. The use of such dies eliminates weld lines and the problems associated therewith. Cross-head type dies can be used in such applications. For instance, a side-fed manifold die can be used for extruding the rubber composition into the form of a tube which is later shaped into the desired form of the hose and subsequently cured. The use of such side-fed manifold dies results in the flow of polymer being split at the inlet to the manifold and recombined 180° from the inlet. Due to this design, the polymer flowing around the mandrel has a lower distance to travel than the polymer which does not have to flow all the way around the mandrel.

Accordingly, such side-fed manifold dies should be designed in a manner whereby the mandrel is placed eccentrically in the die allowing for a wider gap at the remote end from the lead port to provide a uniform flow rate. Such side-fed manifold dies can be designed in a manner whereby there is an essentially uniform flow rate, but the shear rate and temperature histories of the polymer being extruded will remain nonuniform.

Spiral mandrel dies are highly preferred because they allow for a virtually uniform flow rate, shear rate and temperature history. The use of such spiral mandrel dies also, of course, eliminates the problem of weld lines. The spiral mandrel die distributes the flow of rubber composition into separate feed ports or flow tubes. Each of these ports feeds the rubber composition in a spiral groove cut into the mandrel. The spiral decreases in cross-sectional area, whereas the gap between the mandrel and the die increases toward the exit. This results in a mixing or "layering" of polymer from the various feed ports. The utilization of such spiral mandrel dies results in a very uniform tube and their utilization in practicing this invention is highly preferred. Excellent results can also be attained by utilizing a Monsanto Expanding Pin and Die.

The rubber composition which is extruded or injection-molded is comprised of (a) polypropylene/polyethylene alloy comprised of (i) low melt index polyethylene and (ii) polypropylene, wherein the polypropylene is homogeneously dispersed throughout the polyethylene in the polypropylene/polyethylene alloy, (b) an EPDM rubber, (c) carbon black, (d) at least one curative, (e) zinc oxide, (f) a processing oil and (g) stearic acid. The total amount of the polypropylene/polyethylene alloy in the rubber composition will be within the range of from about 2 phr to about 50 phr (parts per hundred parts of rubber). This is the total amount of thermoplastic alloy (polypropylene and polyethylene) dispersed in the EPDM. It is normally preferred for the amount of polypropylene/polyethylene alloy in the composition to be within the range of about 3 phr to about 30 phr. It is more preferred for the amount of polypropylene/polyethylene alloy in the rubber composition to be within the range of about 4 phr to about 20 phr, due to process considerations.

The polypropylene/polyethylene alloy will normally contain from about 30 weight percent to about 90 weight percent polyethylene and from about 10 to about 70 weight percent polypropylene. The polypropylene/polyethylene alloy will preferably contain from about 40 weight percent to about 75 weight percent polyethylene and from about 25 to about 60 weight percent polypropylene. The polypropylene/polyethylene alloy will most preferably contain from about 55 weight percent to about 65 weight percent polyethylene and from about 35 to about 45 weight percent polypropylene.

The polyethylene employed in the polypropylene/polyethylene alloy has a low melt index which is typically within the range of about 0.05 g/10 minutes to about 1.5 g/10 minutes. The low melt index polyethylene preferably has a melt index which is within the range of about 0.10 g/10 minutes to about 1.0 g/10 minutes. The low melt index polyethylene more preferably has a melt index which is within the range of about 0.15 g/10 minutes to about 0.35 g/10 minutes. The melt index of the polyethylene is determined by measuring the amount of polyethylene which can be forced through an orifice of 0.376 inches in diameter in 10 minutes at a temperature of 190° C. under a load of 2160 g.

In the preparation of such alloys, the thermoplastics (the polyethylene and the polypropylene) are normally molten during the period in which they are mixed. The morphology of the dispersed thermoplastic phase during compounding in rubber depends upon a variety of factors. Among these factors is the relative ratio of the viscosities of the phases being mixed. Experience has shown that the domain size of the dispersed phase is smaller when the viscosities of the two phases are closely matched. One means of "matching" these viscosities after the thermoplastic material has melted is to reduce the viscosity of the elastomer phase by increasing the temperature of mixing to further soften the elastomer. However, this approach is not always viable and the temperature control needed to accomplish this objective is very sensitive and the high temperatures needed can severely degrade the rubber component.

The viscosities of the phases can also be "matched" by using low melt index polyethylene in the polyethylene/polypropylene alloy during mixing with the rubber to closely match the viscosity of the melted polyethylene phase of the polyethylene/polypropylene alloy and elastomer. This brings the viscosities of the two phases closer together and results in there being a better dispersion of the thermoplastics. This approach eliminates or reduces the need to raise the mixing temperature to match the viscosities of the phases and leads to dispersion of preformed, but unmelted, micro phases of polypropylene in the rubber compound. This saves the EPDM from undesirable degradation which can occur at higher temperatures. Another benefit realized by using this approach is that much higher concentrations of the thermoplastic can be employed in the alloy without a detrimental effect on processing.

In preparing the rubber composition, it is generally preferred to first prepare a nonproductive blend. Such nonproductive blends contain polymeric components of the rubber composition and certain other compounding ingredients but do not include the curatives. The rubber composition will normally contain from about 80 phr to about 150 phr of carbon black. Typically at least about 80 phr of carbon black is required to provide the level of stiffness desired. On the other hand, the utilization of more than about 150 phr of carbon black leads to compositions which are very difficult to process and extrude. It is normally preferred for the rubber composition to contain from about 100 phr to about 130 phr of carbon black. It is most preferred for the carbon black to be present in the rubber composition at a level which is within the range of about 110 phr to about 125 phr.

It is important to include a processing oil (an extending oil) in the rubber composition at a level which is within the range of about 20 phr to about 90 phr. It is preferred for the processing oil to be present in an amount ranging from about 30 phr to about 70 phr. It is most preferred for the processing oil to be present in the rubber composition at a level which is within the range of about 40 phr to about 50 phr.

Zinc oxide is also included in the rubber composition at a level within the range of about 1 phr to about 10 phr. It is normally preferred for zinc oxide to be present in the rubber composition in an amount which is within the range of about 3 phr to about 8 phr. It is normally more preferred for the zinc oxide to be in the rubber composition at a level which is within the range of about 4 phr to about 6 phr.

Stearic acid is also included in the rubber composition in an amount which is within the range of about 0.25 phr to about 5 phr. It is preferred for the stearic acid to be present in the rubber composition in an amount which is within the range of about 0.5 phr to about 4 phr. It is most preferred for the stearic acid to be present in the rubber composition at a level which is within the range of about 1 phr to about 3 phr.

In most cases, it is desirable to include a chopped polymeric fiber in the rubber composition to reduce the circumferential swell of hoses made therewith at high temperatures. A wide variety of polymeric fibers can be used for this purpose. Some representative examples of polymeric fibers which can be used include rayon fibers, cellulose fibers, nylon fibers, polyester fibers and polyaramide fibers. Polyaramide fibers, such as Kevlar® polyaramide fibers, are preferred. The chopped polymeric fiber will typically be included in the rubber composition in an amount which is within the range of about 0.5 phr to about 15 phr. The chopped polymeric fiber will preferably be included in the rubber composition in an amount which is within the range of about 4 phr to about 8 phr.

The productive rubber composition is prepared by adding a curative, such as sulfur, and an accelerator to the nonproductive rubber composition. Sulfur or a sulfur-containing compound is typically added in an amount which is within the range of about 0.2 phr to 6 phr. It is normally preferred for sulfur to be present in the productive rubber composition in an amount which is within the range of about 0.3 phr to 4 phr. It is most preferred for sulfur to be present in the rubber composition in an amount which is within the range of 0.5 phr to 2 phr.

One or more accelerators will also be included 5 with sulfur curatives in the productive rubber composition. Some representative examples of accelerators which can be used include: benzothiazyl disulfide, 2-mercaptobenzothiazole, N-oxydiethylene benzothiazole-2-sulfenamide, N-cyclohexyl-2-benzothiazolesulfenamide, bismuth dimethyldithiocarbamate, cadmium diethyldithiocarbamate, copper dimethyldithiocarbamate, lead dimethyldithiocarbamate, selenium diethyldithiocarbamate, selenium dimethyldithiocarbamate, tellurium diethyldithiocarbamate, zinc dimethyldithiocarbamate, zinc dibutyldithiocarbamate, tetramethylthiuram disulfide, tetraethylthiuram disulfide, dipentamethylene thiuram hexasulfide, tetramethylthiuram monosulfide and dimethylethyl thiourea. The productive rubber composition containing sulfur curatives will typically contain from about 1 phr to about 12 phr of accelerator. It is normally preferred for the accelerators to be present in an amount which is within the range of about 2.5 phr to about 10 phr. It is most preferred for the accelerator to be utilized at a level which is within the range of about 4 phr to about 8 phr.

Productive rubber compositions can also be made with peroxide curatives. Such peroxide curatives will normally contain at least one peroxide compound, a crosslinking agent and zinc oxide. It should be noted that zinc oxide is also used in standard sulfur curative systems. A wide variety of peroxide compounds can be used in such peroxide curative systems. However, acidic materials, such as peroxides based on acids or esters, should be avoided. Some representative examples of peroxide compounds which can be used include: methylethyl ketone peroxide, cyclohexanone peroxide, cumene hydroperoxide, pinane hydroperoxide, p-menthane hydroperoxide, t-butyl hydroperoxide, dicumyl peroxide, 2,5-dimethylhexane-2,5-dihydroperoxide, di-t-butyl peroxide and the like. Dicumyl peroxide and di-t-butyl peroxide are highly preferred peroxide compounds. Some representative examples of crosslinking agents which can be used include: pentaerythritol tetraacrylate, trimethylol trimethacrylate and diallyl phthalate.

After the rubber composition is extruded into the form of a tube, the tube is shaped into the geometric form desired for the hose. Some extruding equipment can do this automatically. However, in manual operations, it is necessary to bend the tube into the desired shape. This can be done on a mandrel or any other type of device which is capable of imposing the desired shape to the hose. Any scrap material generated in this shaping operation can be recycled to the extrusion step.

The shaped tube is cured in the final step at a temperature which is within the range of 130° C. to 210° C. to produce the hose. This curing step can be carried out by simply heating the shaped tube to the desired curing temperature. It is, of course, highly desirable to physically restrain the tube in the desired shape during the curing operation. The curing step is preferably carried out at a temperature which is within the range of about 140° C. to about 200° C. It is most preferred for the curing step to be conducted at a temperature which is within the range of about 170° C. to about 195° C.

In an alternative embodiment of this invention, the hose can be made by injection molding. when injection molding is used, the hose is molded directly into the desired shape. The injection molding is normally conducted at a temperature which is within the range of 130° C. to 210° C., which is sufficient to cure the rubber composition in the desired geometric shape. It is preferred to utilize a temperature within the range of 140° C. to 200° C., with temperatures within the range of 170° C. to 195° C. being most preferred.

This invention is illustrated by the following examples which are merely for the purpose of illustration and are not to be regarded as limiting the scope of the invention or the manner in which it can be practiced. Unless specifically indicated otherwise, all parts and percentages are given by weight.

EXAMPLES 1–3

A polyethylene/polypropylene (PE/PP) alloy was prepared by mixing low melt index polyethylene with standard polypropylene in a 60:40 ratio at 165° C.–180° C. The low melt index polymer had a melt index of 0.25 g/10 minutes. This mixing was carried out in a twin screw extruder wherein the extruder temperature 25 was held between 325° F. to 425° F. (163° C. to 218° C.) and an average residence time of from 2 to 4 minutes was maintained. The extrudate temperature was typically in the 356° F. to 392° F. (180° C. to 200° C.) range. The alloy was water-cooled and pelletized after mixing.

A rubber blend containing the polyethylene/polypropylene alloy and an EPDM stock was prepared in a Banbury mixer using two stages of addition. The rubber stock was one characteristic of those used in hose applications. For the purposes of comparison, rubber stocks were prepared as shown in Table I with various combinations of alloy and EPDM being mixed in the first stage with conventional amounts of carbon black, processing oil, zinc oxide and stearic acid. The first stage mix was conducted for 2.5 minutes at 165° C. and 65 rpm. Next, the second stage reactants were added to make a productive blend. The second stage reactants were sulfur, accelerators and metal dithiocarbamate. The second stage was mixed for 2.0 minutes at 120° C. and 35 rpm. Test specimens from this stock were prepared by shaping according to the test requirement and curing the stock for 18 minutes at 340° F. (171° C.). Hose samples were made for the purpose of determining burst strength.

TABLE I

|   | Example 1 | Example 2 | Example 3 |
|---|---|---|---|
| PP/PE Alloy, phr | 0 | 10 | 15 |
| EPDM, phr | 100 | 100 | 100 |
| Oil, phr | 45 | 45 | 45 |
| Modulus, 100% | 5.5 | 5.0 | 5.2 |
| Modulus, 200% | 9.7 | 9.3 | 9.3 |
| Tensile, MPa | 14.2 | 14.9 | 14.5 |
| Elongation, % | 348 | 428 | 401 |
| Shore A hardness | 78 | — | — |
| Burst Strength, psi (hose) | 116 | 125 | 142 |

As can be seen from Table I, the polypropylene/polyethylene alloy increased the burst strength of hoses made in Examples 2 and 3. The burst strength realized employing 15 phr of the alloy (Example 3) was greater than the burst strength exhibited when only 10 phr of the alloy was used (Example 2).

EXAMPLES 4–6

The procedure utilized in Examples 1–3 was repeated in this series of experiments except for the fact that the level of oil was increased to 50 phr. In Examples 5 and 6, higher levels of the polypropylene/polyethylene alloy were evaluated. The results of this series of experiments are shown in Table II.

TABLE II

|   | Example 4 | Example 5 | Example 6 |
|---|---|---|---|
| PP/PE Alloy, phr | 10 | 20 | 30 |
| EPDM | 100 | 100 | 100 |
| Oil | 50 | 50 | 50 |

TABLE II-continued

|   | Example 4 | Example 5 | Example 6 |
|---|---|---|---|
| Shore A Hardness | 85 | 85 | 87 |
| Burst Strength, psi | 126 | 150 | 177 |

As can be seen from Table II, the burst strength of the hose was significantly increased without increasing the Shore A hardness to unacceptable levels. Example 5 shows that the burst strength of the hose could be increased to at least 150 pounds per square inch without increasing the Shore A hardness of the hose to over 85. In Example 6, the burst strength of the hose was increased to over 175 pounds per square inch while maintaining the Shore A hardness below 88. This experiment shows that commercially acceptable hose for automotive applications could be made by utilizing the technique of this invention.

COMPARATIVE EXAMPLE 7

In this experiment, a hose was made using the procedure described in Example 4–6 except that polypropylene was used in place of the polypropylene/polyethylene alloy. The burst strength of the hose made decreased with increasing levels of the polypropylene. The hoses made substituting polypropylene for the polypropylene/polyethylene alloy typically had a burst strength of about 105 pounds per square inch and a Shore A hardness of about 78. Thus, commercially acceptable hoses could not be made when polypropylene was substituted for the polypropylene/polyethylene alloy.

COMPARATIVE EXAMPLE 8

In this experiment, a hose was made using the procedure described in Example 4–6 except that polyethylene was used in place of the polypropylene/polyethylene alloy. The high temperature burst strength of the hose made was insufficient for commercial automotive applications. The hoses made substituting polyethylene for the polypropylene/polyethylene alloy also exhibited too much circumferential swell to be commercially acceptable in automotive applications. Thus, commercially acceptable hoses could not be made when polyethylene was substituted for the polypropylene/polyethylene alloy.

Fillers, such as carbon black, can be used to increase the burst strength of the hose. However, attempts to increase burst strength to above 140 pounds per square inch results in an unacceptable increase in hardness (a Shore A hardness of greater than 88).

While certain representative embodiments and details have been shown for the purpose of illustrating the subject invention, it will be apparent to those skilled in this art that various changes and modifications can be made therein without departing from the scope of the subject invention.

What is claimed is:

1. A hose made by the process which comprises (1) extruding a rubber composition into the form of a tube, wherein the rubber composition is comprised of (a) a polyethylene/polypropylene alloy comprised of (i) low melt index polyethylene having a melt index which is within the range of about 0.05 g/10 minutes to about 1.5 g/10 minutes and (ii) polypropylene, wherein the polypropylene is homogeneously dispersed throughout the polyethylene in the polypropylene/polyethylene alloy, (b) an EPDM rubber, (c) carbon black, (d) at least one curative, (e) zinc oxide, (f) a processing oil and (g) stearic acid; (2) shaping the tube into the geometric form desired for the hose; and (3) curing the rubber composition at a temperature within the range of 130° C. to 210° C. to produce the hose; wherein said hose has a burst strength of at least 140 pounds per square inch and wherein said hose is void of fabric reinforcement.

2. A hose as specified in claim 1 wherein said hose has a Shore A hardness of no more than about 88.

3. A hose as specified in claim 2 wherein the thermoplastic is a polyethylene/polypropylene alloy and wherein the amount of alloy is sufficient for there to be from about 2 phr to about 30 phr of polypropylene in the rubber composition based upon the total amount of EPDM rubber in the composition.

4. A hose as specified in claim 2 wherein the rubber composition contains from about 80 phr to about 150 phr of carbon black, from about 20 phr to about 90 phr of processing oil, from about 1 phr to about 10 phr of zinc oxide, from about 0.25 phr to about 5 phr of stearic acid, from about 0.2 phr to about 6 phr of sulfur and from about 1 phr to about 12 phr of accelerator.

5. A hose as specified in claim 4 wherein the rubber composition is cured at a temperature which is within the range of about 140° C. to about 200° C.

6. A hose as specified in claim 2 wherein the rubber composition is extruded into the form of a tube utilizing a spiral mandrel die.

7. A hose as specified in claim 2 wherein the thermoplastic is polyethylene/polypropylene alloy and wherein the rubber composition contains from about 3 phr to about 30 phr of polypropylene, from about 100 phr to about 130 phr of carbon black, from about 30 phr to about 70 phr of processing oil, from about 3 phr to about 8 phr of zinc oxide, from about 0.5 phr to about 4 phr of stearic acid, from about 0.3 phr to about 4 phr of sulfur and from about 2.5 phr to about 10 phr of accelerators.

8. A hose as specified in claim 2 wherein the rubber composition contains from about 4 phr to about 30 phr of polypropylene, from about 110 phr to about 125 phr of carbon black, from about 40 phr to about 50 phr of processing oil, from about 4 phr to about 6 phr of zinc oxide, from about 1 phr to about 3 phr of stearic acid, from about 0.5 phr to about 2 phr of sulfur and from about 4 phr to about 8 phr of accelerator.

9. A hose as specified in claim 7 wherein the accelerator is comprised of a combination of mercaptobenzothiazole, tetramethylthiuram disulfide and zinc dibutyldithiocarbamate.

10. A hose as specified in claim 9 wherein said rubber composition is cured at a temperature which is within the range of about 170° C. to about 195° C.

11. A hose as specified in claim 10 wherein said hose has a burst strength of at least 150 pounds per square inch and a Shore A hardness of no more than about 85.

12. A hose made by the process which comprises injection molding a rubber composition into the desired geometric form for the hose at a temperature which is within the range of 130° C. to 210° C., wherein the rubber composition is comprised of (a) a polypropylene/polyethylene alloy comprised of (i) a low melt index polyethylene having a melt index which is within the range of about 0.05 g/10 minutes to about 1.5 g/10 minutes and (ii) polypropylene, wherein the polypropylene is homogeneously dispersed throughout the polyethylene in the polypropylene/polyethylene alloy, (b) an EPDM rubber, (c) carbon black, (d) at least one curative, (e) zinc oxide, (f) a processing oil and (g) stearic acid; (2) shaping the tube into the geometric form desired for the hose; and (3) curing the rubber composition at a temperature within the range of 130° C. to 210° C. to produce the hose; wherein said hose has a burst strength of at least 140 pounds per square inch and wherein said hose is void of fabric reinforcement.

13. A hose as specified in claim 12 wherein said hose has a Shore A hardness of no more than about 88.

14. A hose as specified in claim 13 wherein the amount of alloy is sufficient for there to be from about 2 phr to about 50 phr of polypropylene in the rubber composition based upon the total amount of EPDM rubber in the composition.

15. A hose as specified in claim 14 wherein the rubber composition contains from about 80 phr to about 150 phr of carbon black, from about 20 phr to about 90 phr of processing oil, from about 1 phr to about 10 phr of zinc oxide, from about 0.25 phr to about 5 phr of stearic acid, from about 0.2 phr to about 6 phr of sulfur and from about 1 phr to about 12 phr of accelerator.

16. A hose as specified in claim 15 wherein the rubber composition contains from about 3 phr to about 30 phr of polypropylene, from about 100 phr to about 130 phr of carbon black, from about 30 phr to about 70 phr of processing oil, from about 3 phr to about 8 phr of zinc oxide, from about 0.5 phr to about 4 phr of stearic acid, from about 0.3 phr to about 4 phr of sulfur and from about 2.5 phr to about 10 phr of accelerators.

17. A hose as specified in claim 15 wherein the rubber composition contains from about 4 phr to about 30 phr of polypropylene derived from polyethylene/polypropylene alloy, from about 110 phr to about 125 phr of carbon black, from about 40 phr to about 50 phr of processing oil, from about 4 phr to about 6 phr of zinc oxide, from about 1 phr to about 3 phr of stearic acid, from about 0.5 phr to about 2 phr of sulfur and from about 4 phr to about 8 phr of accelerator.

18. A hose as specified in claim 17 wherein said hose has a burst strength of at least 150 pounds per square inch and a Shore A hardness of no more than about 85.

\* \* \* \* \*